(12) United States Patent
Eliasson et al.

(10) Patent No.: US 10,464,381 B2
(45) Date of Patent: Nov. 5, 2019

(54) VEHICLE COUPLING DEVICE

(71) Applicant: Dellner Couplers AB, Falun (SE)

(72) Inventors: Anders Eliasson, Borlänge (SE);
Stefan Heinås, Falun (SE); Jean Major, Indian Land, SC (US)

(73) Assignee: Dellner Couplers AB, Falun (SE)

( * ) Notice: Subject to any disclaimer, the term of this patent is extended or adjusted under 35 U.S.C. 154(b) by 219 days.

(21) Appl. No.: 15/411,475

(22) Filed: Jan. 20, 2017

(65) Prior Publication Data

US 2018/0208007 A1  Jul. 26, 2018

(51) Int. Cl.
| | |
|---|---|
| *B61G 7/14* | (2006.01) |
| *B60D 1/145* | (2006.01) |
| *B61G 9/24* | (2006.01) |
| *B61G 9/04* | (2006.01) |
| *B61G 1/10* | (2006.01) |
| *B61G 3/00* | (2006.01) |

(52) U.S. Cl.
CPC ............... *B60D 1/145* (2013.01); *B61G 1/10* (2013.01); *B61G 3/00* (2013.01); *B61G 7/14* (2013.01); *B61G 9/04* (2013.01); *B61G 9/24* (2013.01)

(58) Field of Classification Search
CPC . B60D 1/145; B60D 1/24; B60D 1/28; B61G 9/04; B61G 7/14; B61G 11/16; B61G 7/10; B61G 9/10; B61G 9/24; B61D 15/06
See application file for complete search history.

(56) References Cited

U.S. PATENT DOCUMENTS

| | | | |
|---|---|---|---|
| 3,247,977 A | 4/1966 | Dilg | |
| 3,515,288 A | 6/1970 | Frill et al. | |
| 3,610,434 A * | 10/1971 | Herbert | B61G 7/06 180/14.5 |
| 4,064,998 A * | 12/1977 | Dilg | B61G 7/10 213/12 |
| 5,305,899 A | 4/1994 | Kaufhold | |
| 5,312,007 A | 5/1994 | Kaufhold et al. | |
| 5,360,124 A | 11/1994 | Wurzer et al. | |
| 5,598,937 A | 2/1997 | Clark | |
| 6,499,613 B1 * | 12/2002 | Grau | B61G 7/14 213/7 |
| 7,766,177 B2 * | 8/2010 | Stepp | B61G 9/22 213/7 |
| 2014/0190707 A1 * | 7/2014 | Hered | E21B 21/103 166/381 |

* cited by examiner

*Primary Examiner* — Mark T Le
(74) *Attorney, Agent, or Firm* — Howard IP Law Group

(57) ABSTRACT

A vehicle coupler including a coupling head and a dampening device attached thereto. A beam is provided and configured to attach to the vehicle. A housing assembly is connected to the beam and configured to receive a portion of the dampening device. A first release mechanism in the form of a shear ring is arranged within the housing assembly and is configured to provide a releasable connection between the dampening device and the housing assembly. A second release device in the form of a plurality of shear elements provides a releasable connection between the beam and the housing assembly. A preload mechanism may also be provided for applying an initial shearing force on the plurality of shear elements.

18 Claims, 7 Drawing Sheets

VEHICLE COUPLING DEVICE

FIELD OF THE INVENTION

The application relates to devices for providing a mechanical coupling between, for example, railcars or mass transit rail vehicles.

BACKGROUND OF THE INVENTION

Series connected vehicles, such as railcars, are typically mechanically attached to one another via coupling devices or couplers. These couplers often include a dampening device, such as a draft gear, for absorbing normal tension (draft) and compression (buff) forces, resulting in a degree of travel, between connected vehicles. In the event of excess buff forces, such as those generated during a collision, a release mechanism may also be provided for permitting additional travel of the coupler relative to a vehicle associated therewith. Release mechanisms may include, for example, a plurality of bolts or pins arranged between various components of the coupler. The release of these elements allows for additional relative motion between these components. Release mechanisms of the prior art, however, often suffer from asymmetric loading, leading to non-uniform release characteristics (e.g., not contemporaneous). Moreover, upon activation of the release mechanism of the prior art it may no longer be possible to tow a vehicle via its coupler, as may be desired after a collision or other damaging event.

Vehicle couplers having improved release characteristics, as well as the ability to be utilized after a collision, are desired.

SUMMARY

A vehicle coupler according to an embodiment of the present disclosure comprises a dampening device configured to attach to a coupling head, a beam for connecting to a vehicle, and a housing connected to the beam and configured to receive a portion of the dampening device. A first or lower force release element or mechanism is enclosed within the housing and configured to provide a releasable connection between the dampening device and the housing. A second or higher force release element or mechanism provides a releasable connection between the beam and the housing.

In another embodiment of the represent disclosure, a vehicle coupler assembly includes a dampening device for attaching to a coupling head. A beam is provided and configured to attach to the vehicle. A housing is connected to the beam and configured to receive a portion of the dampening device. A first release mechanism in the form of a shear ring is arranged within the housing and configured to provide a releasable connection between the dampening device and the housing. A second release mechanism in the form of a plurality of shear elements provides a releasable connection between the beam and the housing.

In still another embodiment of the present disclosure, a vehicle coupler comprises a dampening device configured to attach to a coupling head, a beam for connecting to a vehicle, and a housing connected to the beam and configured to receive a portion of the dampening device. A plurality of shear elements are arranged between the beam and the housing for providing a releasable connection therebetween. A preload mechanism is also provided and configured to apply an initial shearing force on the plurality of shear elements.

DETAILED DESCRIPTION

It is to be understood that the figures and descriptions of the present invention have been simplified to illustrate elements that are relevant for a clear understanding of the present invention, while eliminating, for purposes of clarity, many other elements found in typical vehicle coupling systems. However, because such elements are well known, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure are directed to improved coupling devices for vehicles, such as railway cars. In one embodiment, a vehicle coupler comprises a coupling head configured to be attached on one end thereof to a corresponding coupling head of another vehicle. The coupling head is attached at another end thereof to a dampening device or mechanism, such as a draft gear. At least a portion of the dampening mechanism is arranged within a housing. The housing is connected to a beam which is configured to connect to the vehicle. In one embodiment, a first or lower force release device or mechanism, such as a shear ring, is provided and enclosed within the housing for providing a releasable connection between the dampening mechanism and the housing. A second or higher force release device or mechanism, such as a plurality of bolts or pins, provides a releasable connection between the beam and the housing. A preload mechanism may be provided to ensure even load distribution over the elements of the second release device.

Figure 1A:
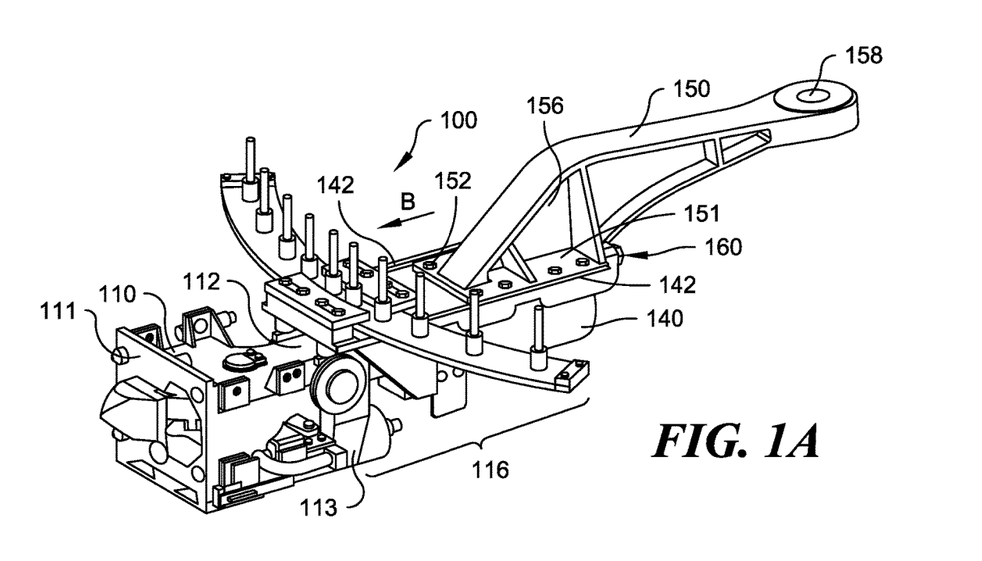
FIG. 1A is a first perspective view of a vehicle coupler according to an embodiment of the present disclosure.
Figure 1B:
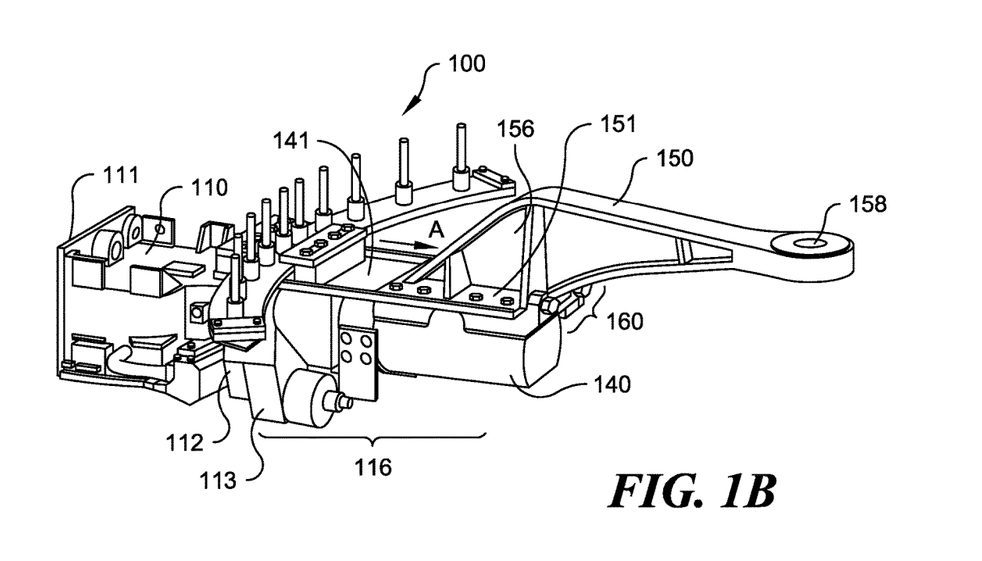
FIG. 1B is a second perspective view of the vehicle coupler of FIG. 1A.

Referring generally to FIGS. 1A and 1B, a vehicle coupler or coupling device 100 according to an embodiment of the present disclosure is configured to fixedly attach to a first vehicle (not shown) and includes a coupling head 110 having a first end 111 configured to selectively attach to or engage with a corresponding coupling head associated with a second vehicle (not shown). A second end 112 of coupling head 110 is configured to attach to a first end 113 of an energy absorbing or dampening device or mechanism 116 (e.g. a draft gear). A second end or end portion (118, FIG. 5) of dampening mechanism 116 is arranged within an interior cavity (143, FIG. 5) of a housing or housing assembly 140. Dampening mechanism 116 is releasably attached to housing 140 via a first or lower force release mechanism or element, such as a shear ring, as will be set forth in greater detail herein with respect to FIG. 4-6. As will be understood by one of ordinary skill in the art, dampening mechanism 116 is configured to permit a degree of travel or stroke of coupling head 110 relative to housing assembly 140, while absorbing draft forces (acting in a direction "B") and buff forces (acting in a direction "A") between coupled vehicles by transferring an amount of these forces between coupling head 110 and housing assembly 140.

Coupling device 100 further comprises a beam 150 configured to connect coupling head 110 and housing assembly 140 to a vehicle. Beam 150 includes a generally planar portion 151 for attaching to housing assembly 140. An arm portion 156 extends from planar portion 151 and is configured to attach (e.g. pivotally) to a portion of the vehicle via aperture 158. Beam 150, including planar portion 151 and arm portion 156, may comprise a single, unitary metallic member formed via casting, for example. In other embodiments, portions of beam 150 may be formed separately and fixedly attached to one another via conventional means, such as welding and/or mechanical fastening.

Housing assembly 140 is releasably attached to beam 150 such that it (as well as coupling head 110 and dampening mechanism 116) are fixedly attached prior to a release event, and moveably or slideably connected or attached to one another after a release event. Still referring to FIGS. 1A and 1B, planar portion 151 of beam 150 is configured to engage with correspondingly-sized slotted features formed in (or attached to) housing assembly 140. More specifically, housing assembly 140 may comprise a generally planar section or bearing surface 141. Respective lateral ends of planar section 141 include flanges 142 defining respective opposing slotted openings extending along a length of housing assembly 140. Flanges 142 are configured (e.g. sized and located) to slideably receive planar portion 151 of beam 150.

The relative position of housing assembly 140 and beam 150 is releasably fixed in a normal operating condition via a second or higher force release mechanism or element, embodied herein as one or more shear bolts or shear pins 152. As shown in greater detail in FIGS. 2 and 3, shear bolts 152 extend through apertures 154 formed in planar portion 151 of beam 150 and threadably engage with corresponding threaded bores 157 formed in housing assembly 140 and/or planar section 141 thereof. In the illustrated embodiments, while eight (8) shear bolts 152 are shown as defining the second release mechanism, any number or arrangement of shear bolts or shear pins may be utilized without departing from the scope of the present disclosure.

Figure 2:
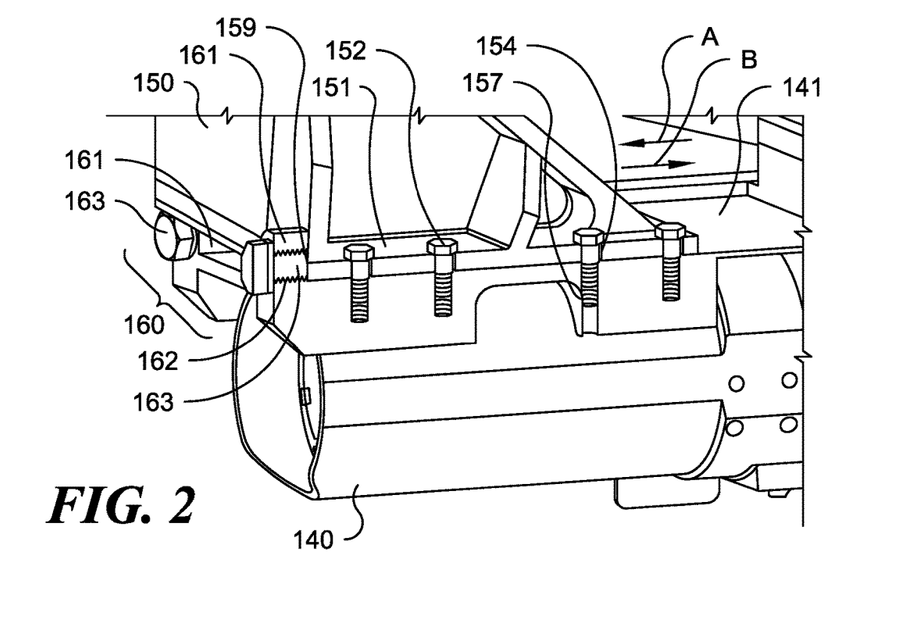
FIG. 2 is a cross-sectional view of a portion of a vehicle coupler according to an embodiment of the present disclosure.
Figure 3:
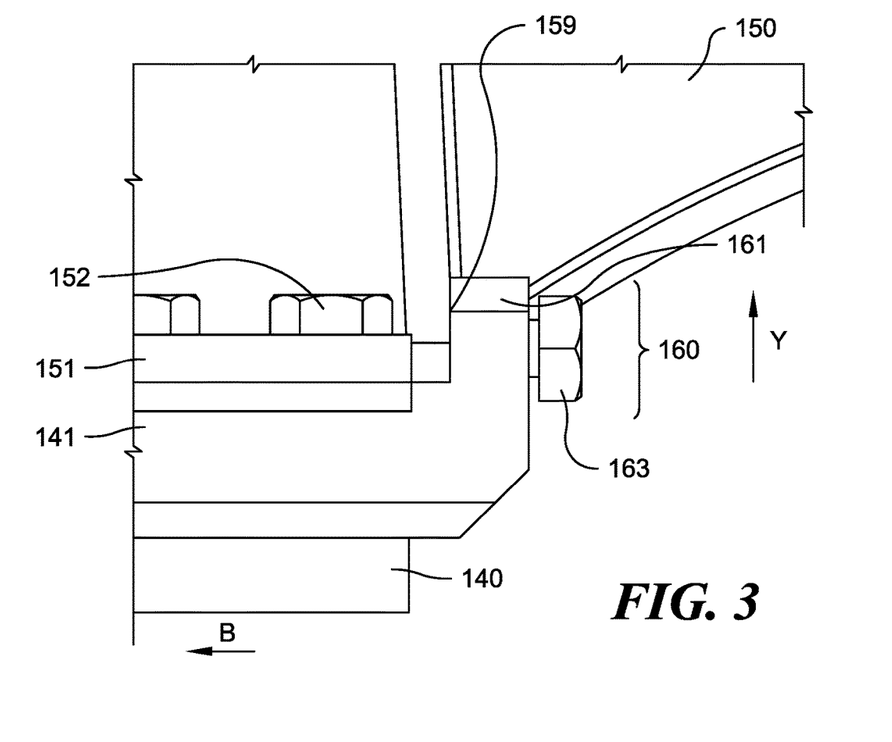
FIG. 3 is partial perspective view of a vehicle coupler according to an embodiment of the present disclosure.

Still referring to FIGS. 2 and 3, housing assembly 140 further comprises a preload mechanism 160 configured to apply a force on the at least one shear element so as to ensure that each shear bolt 152 is subject to equal and contemporaneous shear forces during operation. Preload mechanism 160 includes one or more protrusions or shoulders 161 formed (e.g. cast) as a portion of housing assembly 140. Protrusions 161 extend generally in an illustrated vertical direction Y, such that a portion of each protrusion 161 extends above a height of planar section 141 of housing assembly 140 to a height at least partially overlapping in the vertical direction Y with a portion of beam 150. In the illustrated embodiment, two protrusions 161 are provided, each having a threaded bore 162 formed therethrough. Each bore 162 extends in a direction generally parallel to a plane of travel of the slideable connection formed between housing assembly 140 and beam 150. Threaded members 163 (e.g. threaded fasteners or bolts) are threadably inserted through protrusions 161 such that free ends thereof may bear on or be abutted against a surface 159 of beam 150. In this way, preload mechanism 160 is configured to apply a force on beam 150 acting in a direction B, creating a resulting preload force on each of the at least one shear element, which in his embodiment are shear bolts 152, ensuring the distributed, uniform loading thereof. The preload force is much less than the force required to cause the second release mechanism to release. In one embodiment, threaded members 163 comprise 16 mm fasteners, and are torqued to 125.5 lb-ft (170 Nm) for generating a desired preload force.

Figure 4:
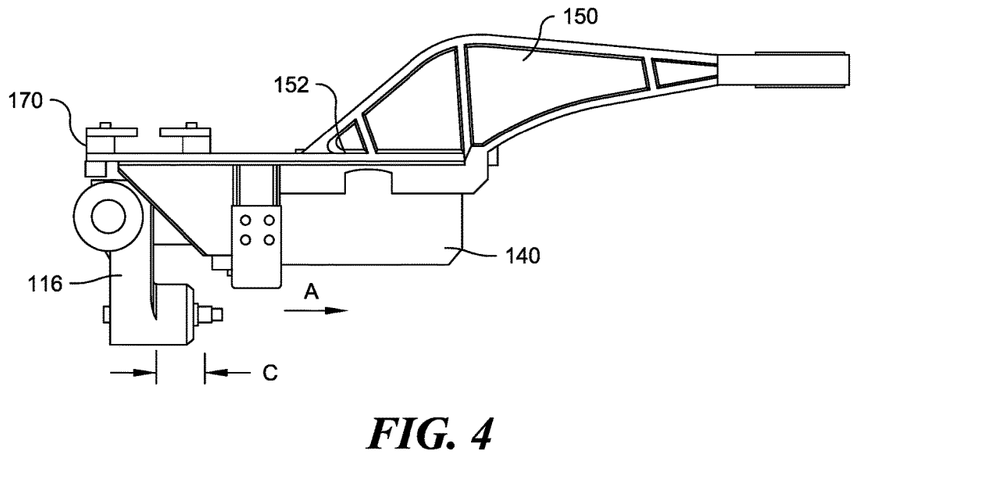
FIG. 4 is a perspective view of a simplified vehicle coupler with a coupling head thereof removed according to an embodiment of the present disclosure.
Figure 5:
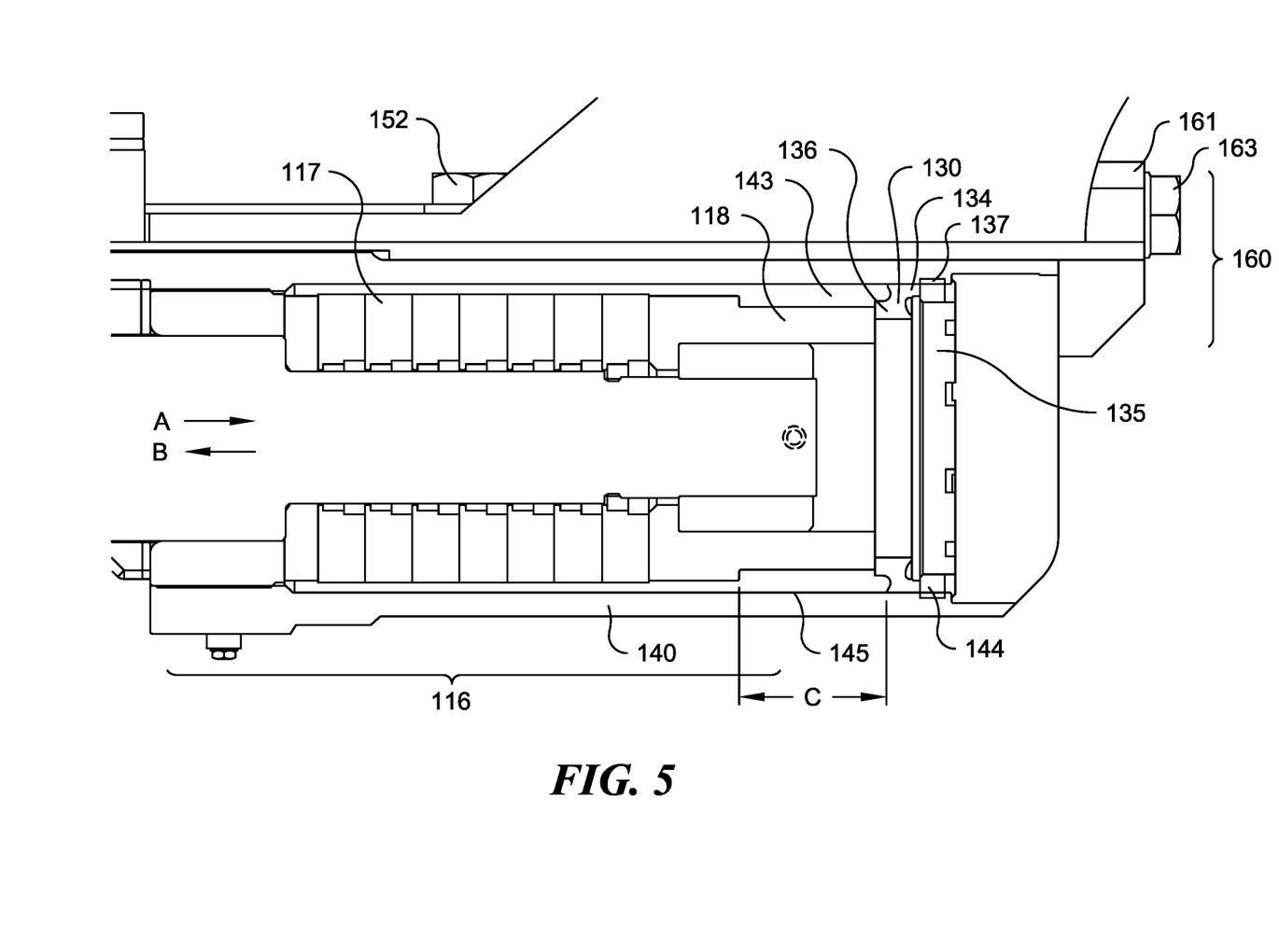
FIG. 5 is a cross-sectional view of a vehicle coupler according to an embodiment of the present disclosure.
Figure 6:
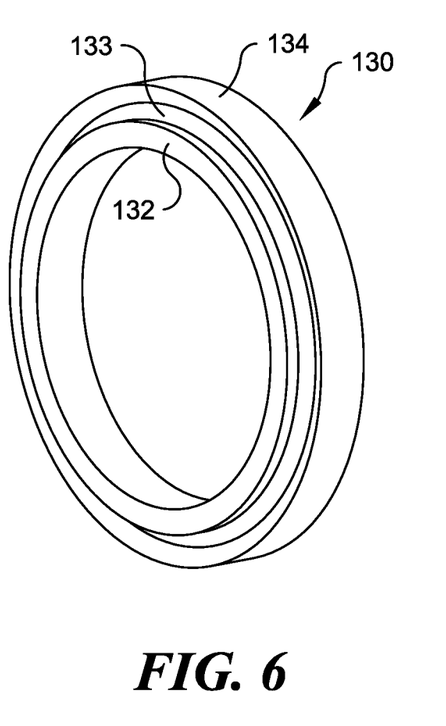
FIG. 6 is a perspective view of a shear ring according to an embodiment of the present disclosure.

Referring generally to FIGS. 4-7C, as set forth above, the first or lower force release mechanism provides a releasable connection between dampening mechanism 116 and housing assembly 140. This first releasable connection provides for additional travel of dampening mechanism 116 (and coupling head 110) relative to housing assembly 140 in the event of excess buff forces acting in the indicated direction A, such as those experienced during a collision. As illustrated in FIGS. 5, 6 and 7A, the first release mechanism is embodied as a shear ring 130 arranged wholly within (i.e. enclosed or contained in) a hollow interior cavity 143 of housing assembly 140. Shear ring 130 comprises a generally annular ring including an outer annular or radial section 134, an inner annular or radial section 132, and an intermediate annular or radial section 133 connecting inner and outer radial sections 132, 134.

Referring again to FIG. 5, as implemented, shear ring 130 is arranged generally between a rearward or end portion 118 of dampening mechanism 116 and a plug nut 135 inserted into an end of interior cavity 143 of housing assembly 140 via a threadable connection 137 with an interior wall 145 of housing assembly 140. In this way, plug nut 135 forms an end interior wall of housing assembly 140, and provides access to shear ring 130 when uninstalled. More specifically, a first or inboard end 134 of shear ring 130 is configured (i.e. sized) to rest against or abut a shoulder 144 of plug nut 135 arranged continuously around interior wall 145 of housing assembly 140. A second or outboard end 136 of inner annular or radial section 132 of shear ring 130 is configured to engage with end portion 118 of dampening mechanism 116. In this way, in the unreleased state of shear ring 130 illustrated in FIGS. 5 and 7A, shear ring 130 is configured to maintain the axial position of end portion 118 of dampening mechanism 116 relative to housing assembly 140 in response to buff forces acting on dampening mechanism 116 in direction A. This axial position of dampening mechanism 116 corresponds to a distance D between a portion 170 of beam 150 and a portion 210 of coupling head 110, the distance D being maintained by shear ring 130.

Figure 7A:
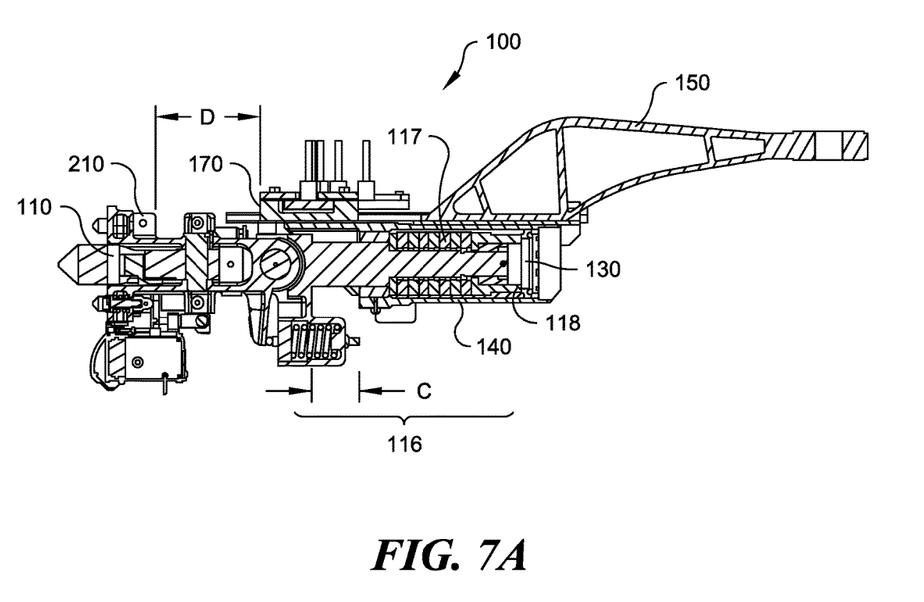
FIG. 7A is a cross-sectional view of a vehicle coupler according to an embodiment of the present disclosure illustrating an operational state prior to a release of a shear ring thereof.
Figure 7B:
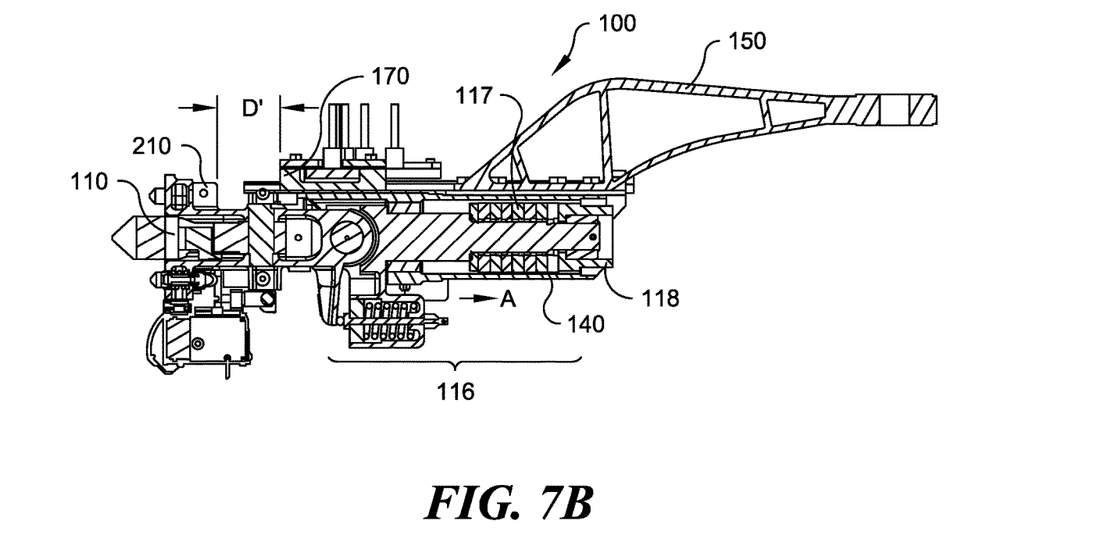
FIG. 7B is a cross-sectional view of the vehicle coupler of FIG. 7A illustrating an operational state after a release of the shear ring.

Referring to FIGS. 5 and 7B, during a force generating event, such as a collision between vehicles, initial buff or compressive forces acting on a coupling head (e.g. coupling head 110 of FIGS. 1A and 1B) in direction A are absorbed via a plurality of stacked elastic elements 117 of dampening mechanism 116. Buff forces in excess of a predetermined magnitude designed to be absorbed by dampening mechanism 116 are transferred to shear ring 130. Shear ring 130 is configured to absorb additional buff or compressive forces up to a first predetermined magnitude, for example 150,000 lbs. (667 kN), above which shear ring 130 is configured to release (e.g. shear in an area of intermediate radial section 133). Otherwise stated, intermediate section 133 of shear ring 130 is configured to shear in response to a compressive force of a first predetermined magnitude acting on the first and second annular sections 132, 134 along an axial direction of shear ring 130. The release of shear ring 130 allows dampening mechanism 116 and a coupling head associated therewith to travel in direction A a predetermined distance C further rearward into interior cavity 143 of housing assembly 140 and toward plug nut 135. A corresponding reduction in distance D (FIG. 7A) to a new distance D' between portion 170 of beam 150 and portion 210 of coupling head 110 is realized.

Figure 7C:
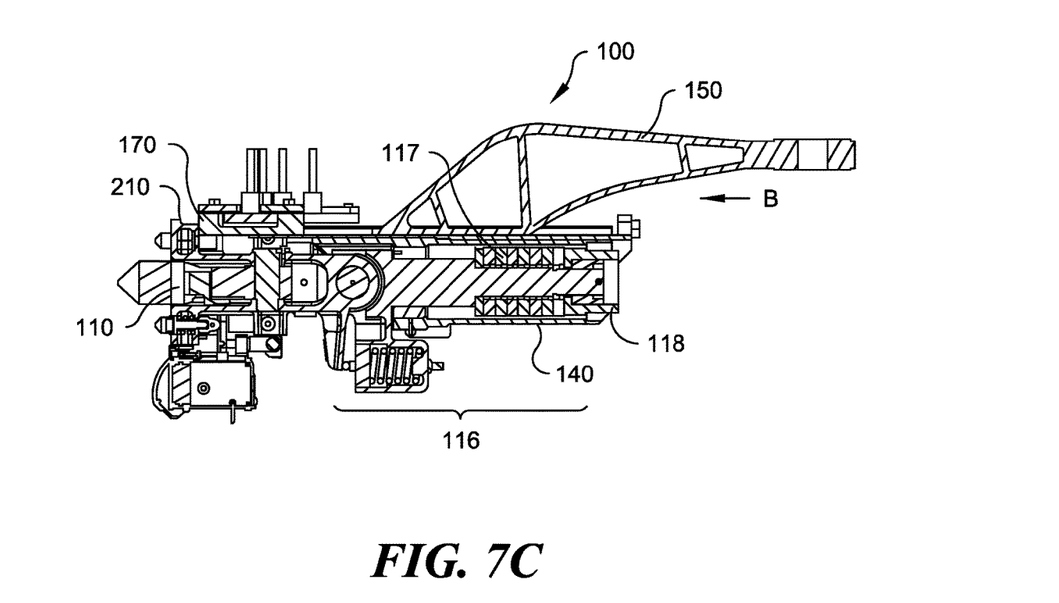
FIG. 7C is a cross-sectional view of the vehicle coupler of FIG. 7B illustrating an operational state after a release of a second mechanism.

Referring now to FIGS. 4 and 7C, after the above-described release of shear ring 130, dampening mechanism 116 travels a first predetermined distance C, and may bottom out within housing assembly 140 (e.g. against plug nut 135 and/or against a remaining portion of shear ring 130), transmitting excess buff forces thereon. These forces are transmitted to beam 150 through at least one shear element, which, in the illustrated embodiment, includes shear bolts 152, defining the second or higher force release mechanism between housing assembly 140 and beam 150. The second or higher force release mechanism is configured to release (i.e. to shear the shear bolts 152) after a second predetermined magnitude of force has been exceeded. This second predetermined magnitude is greater than the first predetermined magnitude, i.e., the force magnitude above which the first release mechanism shears, for example, 200,000 lbs. (890 kN). Upon release of the second release mechanism, housing assembly 140, as well as coupling head 110 and dampening mechanism 116, may be displaced up to second predetermined distance D' relative to beam 150 via the slideable connection formed therebetween. This displacement distance is limited by portion 210 of coupling head 110 which will contact portion 170 of beam 150, as shown in FIG. 7C. In this way, coupling head 110 and housing assembly 140 are moveable with respect to beam 150 between a first position as shown in FIG. 7A, and a second position as shown in FIG. 7C after being displaced in direction A. It should be noted that the predetermined distance of travel D' associated with the release of the second release mechanism is greater than the predetermined distance of travel C associated with the release of the first release mechanism.

In the event of, for example, a collision sufficient to release both the first and second release mechanisms, it may be necessary to tow a vehicle away from an accident site in order to perform repairs. This is generally most advantageously accomplishing using the vehicle's coupler. However, as the second release mechanism no longer prevents motion between beam 150 and housing assembly 140 in response to draft forces placed on coupling head 110, additional provisions must be implemented for facilitating these towing operations. Referring again to FIG. 3, tension or draft forces acting on housing assembly 140 in direction B generated by a towing operation result in the displacement of housing assembly 140 relative to beam 150 in the same direction. Housing assembly 140 will be displaced relative to beam 150 until protrusions 161, or free ends of threaded members 163, of preload mechanism 160 abut beam 150. Once abutted, further towing forces acting in a direction B will be transferred to beam 150. In this way, preload mechanism 160 provides both a release mechanism preloading function, as well as facilitates towing of an associated vehicle despite a release of the second release mechanism.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:
1. A vehicle coupler comprising:
a dampening device configured to attach to a coupling head;
a beam for connecting to a vehicle;
a housing connected to the beam and configured to receive a portion of the dampening device;
a first release mechanism enclosed within an interior of the housing between an end of the dampening device and an end of the housing and configured to provide a releasable connection between the dampening device and the housing, wherein the first release mechanism comprises a shear ring arranged within the housing, wherein the shear ring includes:
an outer annular section which includes an outer annular section face that engages a corresponding annular shoulder arranged in the interior of the housing;
an inner annular section which includes an inner annular section face that engages an end of the dampening device; and
an intermediate annular section between the outer annular section and the inner annular section that is configured to shear to provide the releasable connection between the dampening device and the housing; and
a second release mechanism providing a releasable connection between the beam and the housing.

2. The vehicle coupler of claim 1, wherein the connection between the housing and the beam enables the housing to be moveable with respect to the beam between a first position and a second position, and wherein the second release mechanism maintains the housing in the first position until its release.

3. The vehicle coupler of claim 2, wherein the housing includes a protrusion extending therefrom, the protrusion configured to engage with a portion of the beam in response to an axial tension force placed on the housing after a release of the second release mechanism.

4. The vehicle coupler of claim 3, further comprising a preload mechanism configured to apply a lateral force on the second release mechanism when the housing is in the first position.

5. The vehicle coupler of claim 4, wherein the preload mechanism comprises a threaded member engaged with a threaded bore formed through the protrusion, and wherein a free end of the threaded member engages with a portion of the beam when the housing is in the first position.

6. The vehicle coupler of claim 1, wherein the end of the housing comprises a removable plug nut, wherein removal of the plug nut provides access to the first release mechanism comprising the shear ring arranged within the housing.

7. The vehicle coupler of claim 1, wherein the second release mechanism comprises a plurality of shear bolts or shear pins connecting the beam and the housing.

8. The vehicle coupler of claim 1, wherein the first release mechanism is configured to release in response to a force of a first predetermined magnitude placed on the dampening device, and wherein the second release device is configured to release in response to a force of a second predetermined magnitude, greater than the first predetermined magnitude, placed on the housing.

9. The vehicle coupler of claim 1, wherein in response to a release of the first release mechanism, the dampening device is displaceable a first predetermined distance within the housing, and wherein in response to a release of the second release mechanism, the housing is displaceable relative to the beam a second predetermined distance greater than the first predetermined distance.

10. A vehicle coupling assembly comprising:
a dampening device attached to a coupling head;
a beam for connecting to a vehicle;
a housing attached to the beam and configured to receive a portion of the dampening device;
a shear ring arranged within an interior of the housing between an end of the dampening device and an end of the housing and configured to provide a releasable connection between the dampening device and the housing; and
providing a first releasable connection between the dampening device and the housing;
a plurality of shear elements providing a second releasable connection between the beam and the housing; and
a preload mechanism configured to apply a lateral force on the plurality of shear elements.

11. The coupling assembly of claim 10, wherein the shear ring comprises:
a first annular end abutting a corresponding annular shoulder arranged in an interior of the housing; and
a second annular end abutting a portion of the dampening device; and
an intermediate section arranged between the first and second annular sections,
wherein the intermediate section of the shear ring is configured to shear in response to a compressive force of a first predetermined magnitude acting on the first and second annular sections along an axial direction of the shear ring.

12. The coupling assembly of claim 11, wherein the plurality of shear elements comprise a plurality of shear bolts arranged between the beam and the housing, the plurality of shear bolts configured to shear in response to a force of a second predetermined magnitude greater than force of the first predetermined magnitude.

13. The coupling assembly of claim 10, wherein the preload mechanism comprises a threaded member engaged with a threaded bore formed through a portion of the housing, and wherein a free end of the threaded member engages with a portion of the beam.

14. A vehicle coupler comprising:
a dampening device configured to attach to a coupling head;
a beam for connecting to a vehicle;
a housing connected to the beam and configured to receive a portion of the dampening device;
a plurality of shear elements arranged to provide a releasable connection between the beam and the housing; and
a preload mechanism configured to apply a uniform preload force laterally to each of the plurality of shear elements.

15. The vehicle coupler of claim 14, wherein the preload mechanism comprises:
a threaded bore formed through a portion of the housing; and
a threaded member configured to engaged with the threaded bore,
wherein a free end of the threaded member is configured to engage with a portion of the beam for applying the initial shearing force laterally on the plurality of shear elements.

16. The vehicle coupler of claim 14, wherein the housing is moveable with respect to the beam between a first position and a second position, and wherein the plurality of shear elements maintain the housing in the first position until its release.

17. The vehicle coupler of claim 16, wherein the housing includes a protrusion extending therefrom, the protrusion configured to engage with a portion of the beam in response to an axial tension force placed on the housing after a release of the plurality of shear elements.

18. The vehicle coupler of claim 14, further comprising a shear ring arranged within the housing and configured to provide a releasable connection between the dampening device and the housing.

* * * * *